Figure 1:
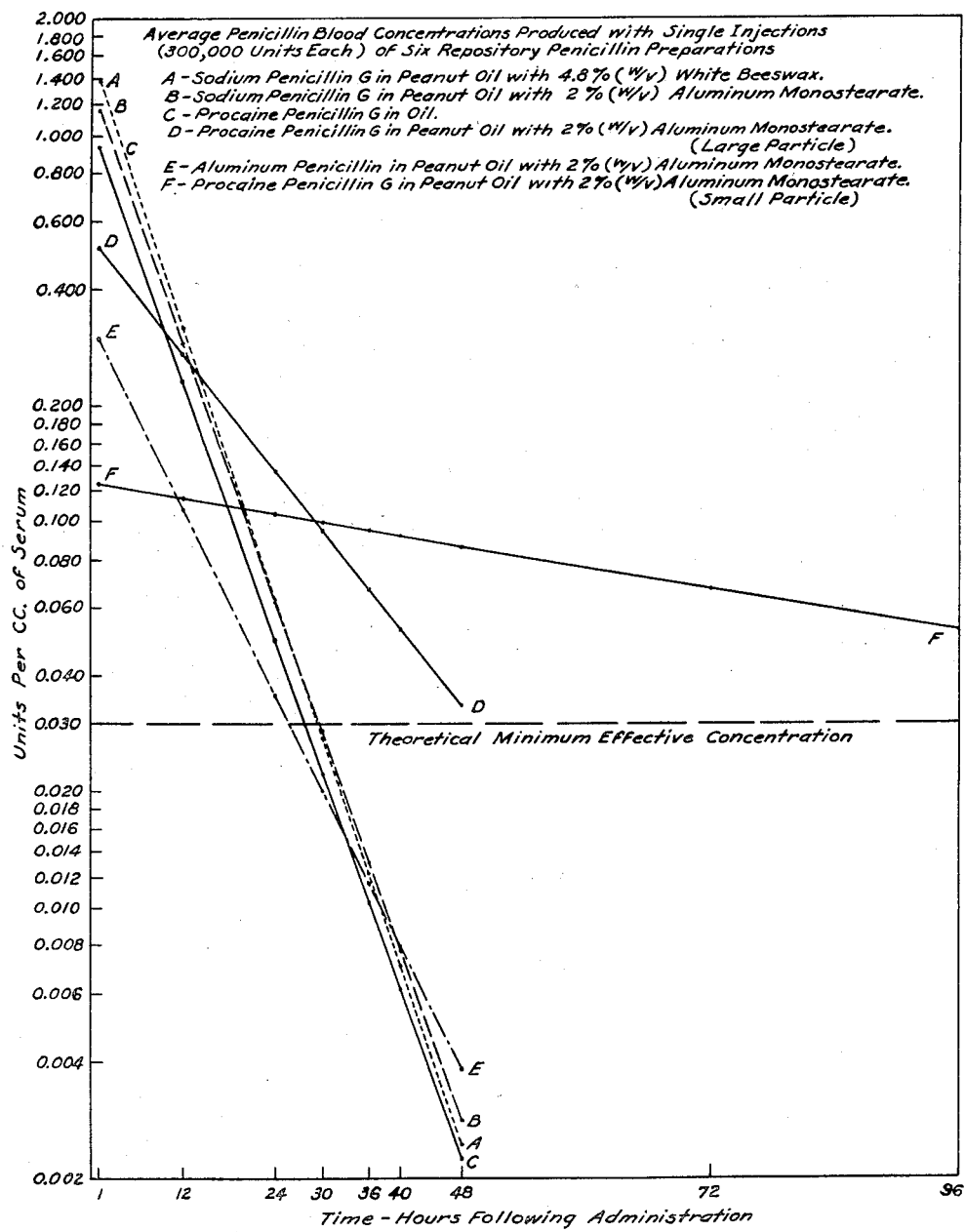

Patented May 9, 1950

2,507,193

UNITED STATES PATENT OFFICE 2,507,193

PENICILLIN PRODUCT

Frank Harold Buckwalter, Dewitt, N. Y., assignor to Bristol Laboratories Inc., Syracuse, N. Y., a corporation of New York Application May 17, 1949, Serial No. 93,640

17 Claims. (Cl. 167—65)

The present invention relates to repository or depot penicillin compositions and in one of its more specific embodiments pertains to a composition comprising small particles of procaine penicillin G having a size below approximately 50 microns suspended in a peanut oil that has been gelled with approximately 2 percent of aluminum monostearate (weight to volume).

This application is a continuation-in-part of each of my two prior copending applications, Serial No. 819, filed January 6, 1948, and Serial No. 19,497, filed April 7, 1948.

A repository or depot composition, as referred to herein, is a composition containing a therapeutic substance which is normally capable of being parenterally injected and which, upon injection, retards or prevents for long periods the rapid absorption of the therapeutic substance in the blood stream. It is essential also that all of the repository composition itself subsequently be absorbed by the body. In the case of certain drugs and penicillin and other antibiotics, which are rapidly absorbed from aqueous solutions into the blood stream and excreted rapidly therefrom, a method of maintaining for long periods a therapeutic concentration or level in the blood without frequent injections is highly desirable.

The use of colloidal masses such as acacia, agar and gelatin to retard the absorption of drugs and biologically active materials has long been known. These, however, are not easily injectable and have not proved satisfactory for providing the blood levels required in penicillin therapy. Another means which has been proposed for maintaining therapeutic blood levels for long periods of time depends upon the establishment of an excretory blockade in the patient by the simultaneous administration of such substances as para-aminohippuric acid, caronamides and "Diodrast" (3,5-diiodo-4-pyridone-N-acetic acid diethanolamine).

The prolongation of therapeutic activity of drugs has also been attempted by use of various slowly absorbed vehicles, such as peanut oil, to which beeswax, globin and similar materials have also been added. Such preparations possess certain disadvantages, however. Penicillin is released much more rapidly than desired from a solution or suspension thereof in peanut oil. Peanut oil preparations containing globin are also unsatisfactory since the action of the drug in the blood stream is not of sufficient duration. In the case of preparations containing penicillin suspended in peanut oil containing beeswax (4.8 percent or thereabout), the preparations are much more viscous than is desirable and the beeswax is an active sensitizer and may produce an allergic reaction upon injection into the body; there is also difficulty in eliminating the beeswax from the tissues after injection, although the absorption of the drug in the blood stream is retarded. Beeswax requires normally from 25 to 30 days for complete assimilation in the body. Sterile abscesses may frequently form when beeswax-containing preparations are used. Another preparation which has been proposed for the parenteral administration of drugs is a suspension of a drug in peanut oil containing pectin, but this has also failed to yield a satisfactory repository effect.

Heretofore aqueous emulsions which contain an oil such as the peanut oil and a drug emulsification being effected and stabilized by use of a soap, have been disclosed as repository or depot preparations, but these cannot be used satisfactorily with penicillin and similar water-soluble antibiotics. The penicillin dissolves in the water and is thus as readily absorbed as an aqueous solution thereof, while any portion of the penicillin which remains dissolved in the oil will not be held at the point of injection any longer than a similar preparation consisting merely of an oil solution of the penicillin.

In preparations of penicillin suspended or dispersed in peanut oil and beeswax, and other preparations of this type prior to my invention, it was found that large crystals of the therapeutically active form of penicillin were retained longer than small crystals and hence it was considered essential and desirable to provide preparations with as large size crystals as could be ejected from a hypodermic needle orifice.

I have discovered that the absorption of penicillin and penicillin salts and derivatives in the blood stream can be greatly reduced and that therapeutic blood levels of penicillin can be maintained for long periods by parenteral injection of a penicillin-containing composition consisting essentially of a therapeutically active form of penicillin suspended or dispersed in an oil that has been gelled with a small proportion of an aluminum stearate or an equivalent thereof. Such a composition is fluid and not unduly viscous and is readily injected through a hypodermic needle, even one of small size. I have also discovered that, whereas it has heretofore been considered necessary to use relatively large particles of the therapeutically active forms of penicillin, particularly procaine, small particles (50 microns or less) in the composition of my invention provide better repository action than larger particles, although particles up to 150 microns in size give therapeutically satisfactory results.

The repository penicillin compositions of my invention, as typified by a dispersion of procaine penicillin G crystals in peanut oil that has been gelled by heating with a small amount of aluminum stearate, and which contain approximately 300,000 Oxford units of penicillin per milliliter, are white dispersions that have the appearance of a solid viscous gel. When disturbed or shaken, however, the composition becomes much more fluid and runs as a liquid having a viscosity between about 230 and about 500 centipoises at a temperature of about 25 degrees centigrade as determined by the Stormer viscosimeter. The composition may be referred to properly as a thixotropic gel suspension and it can readily be pulled up through a needle of a hypodermic syringe and discharged therefrom with even greater facility. Although more viscous and rigid gel compositions are contemplated in the broader aspects of my invention, which compositions may not be as readily drawn up in a hypodermic syringe, these compositions are nonetheless capable of use in "one-shot" syringe equipment in which the composition is dispensed in a compact syringe unit, since they possess even greater fluidity than comparable peanut oil-beeswax preparations and are much more readily ejected from syringes under moderate pressure.

Repository penicillin compositions of my invention may be obtained in the form of thixotropic gels which, after shaking or stirring, flow as liquids but set again to gels on standing. The compositions are substantially anhydrous, that is, no water is added to the oil or the other constituents during their preparation. On adding small amounts of water to the compositions, the gel thickens and loses some of its thixotropic properties; further amounts of water produce a separation of the compositions into an aqueous phase and a viscous oily or waxy solid. Accordingly, it is advisable in using the compositions to keep them dry, as in stoppered vials, and to avoid adding water to them or bringing them into contact with water, as in water-washed but undried syringes, although substantial proportions of water are normally necessary to affect the composition greatly and render it unusable or difficult to dispense.

The repository penicillin compositions of the present invention, when injected intromuscularly in a dosage of 1 cubic centimeter (milliliter) containing 300,000 units of penicillin, will provide a blood level in excess of 0.03 unit per cubic centimeter of blood over a period of 48 hours, and generally for a period of 96 hours and longer, which is much longer than that provided by any repository penicillin composition heretofore known.

The gel or vehicle portion of the repository composition of my invention is produced from peanut oil or an ester of a fatty acid having 12 or more carbon atoms per molecule. Ethyl oleate is eminently suitable, as are esters of alcohols such as methyl, ethyl, propyl, butyl, glycol and glycerol with long-chain saturated and unsaturated monocarboxylic acids having from 12 to 22 carbon atoms, inclusive. Esters of hydroxy-substituted acids of this group, for example, castor oil, are less suitable than the simple unsubstituted acids. The preferred esters are the fatty oils which are readily saponifiable and which are non-drying; such preferred oils are peanut, sesame, soy bean, cottonseed, and corn. Other saponifiable esters, not included in this group but which are also suitable, are isoamyl salicylate, dibutyl sebacate and ethyl-alpha-phenylbutyrate. The preferred esters are normally liquid, hence beeswax, which is predominantly myricyl palmitate (myricin), the palmitic acid of myricyl alcohol ($C_{30}H_{61}OH$), is not a suitable ester. The esters specified herein include the normal dodecanoic (lauric), tridecanoic, tetradecanoic (myristic), pentadecanoic, hexadecanoic (palmitic), heptadecanoic (margaric), octadecanoic (stearic), nonadecanoic, eicosanoic (arachidic), heneicosanoic, and docosanoic (behenic) acids, as well as their branched-chain isomers and corresponding unsaturated acids, including palmitoleic, oleic, ricinoleic, petroselinic, vaccenic, linoleic, linolenic, eleostearic, licanic, parinaric, gadoleic, arachidonic, cetoleic and erucic acids. Mixtures of esters, such as occur in natural oils and fats, are included within the scope of this invention.

Peanut oil or other suitable ester, as referred to herein, is transformed to a gel before being incorporated into the compositions of the invention. This gelling is effected by treatment of the oil with a small proportion of a salt or soap of aluminum and a fatty acid, for example, an aluminum stearate. Commercial grades of aluminum stearate are suitable and their designations as aluminum monostearate, aluminum distearate and aluminum tristearate, relate more particularly to their content of aluminum rather than to their actual compositions. All three of the purest aluminum stearates referred to are soaps and are generally non-crystalline and probably have similar or identical components which generally conform to the general theoretical formula

$$Al(OH)_x (C_{17}H_{35}COOH)_{3-x}$$

For the purposes of my invention I have found that the products designated as aluminum monostearate and aluminum distearate are very similar in properties and are preferable to aluminum tristearate, although the tristearate is usable for the purpose of my invention. The preparation of these aluminum soaps of fatty acids has heretofore been described and they are well-known articles of commerce.

In place of aluminum salts of fatty acids, I may use for the gellification of the ester a fatty acid salt of germanium or zirconium; however, corresponding barium, zinc, strontium, sodium and potassium salts or soaps do not produce satisfactory gelatin or compositions which possess the desired repository effect.

The preferred salts for the gellification of the ester are aluminum salts of fatty acids and I prefer to use aluminum salts of the same or similar fatty acids as those of the ester. Thus, in gellifying the glycerol ester of lauric acid I prefer to use aluminum laurate instead of aluminum stearate, although eminently satisfactory compositions are produced when aluminum stearate is used for gelling peanut oil. It is not necessary that the acid of the aluminum salt have 12 or more carbon atoms, since there may be acid interchange with the oil and the result will not be substantially different from that obtained by the use of the specified salts.

The function of the various components of my repository composition are not understood clearly and the theory of repository action is complicated further by the fact that so many varied and unrelated substances have exhibited some degree of repository action. From the very nature and behavior of my compositions in comparison with compositions made from peanut oil and beeswax, I believe different actions to be involved in the respective cases. The appearance and characteristics of a composition outside the body reveal little with respect to its action or the transformations it undergoes after injection into the body. Nonetheless, for lack of better knowledge and because clinical data are unavailable and difficult to obtain, I believe the unique properties of the compositions of my invention to be attributable to the gel character of the vehicle. The gel may have a latticework structure in which the metal or metal soap molecules are at various corners of cubes or other patterns formed by the ester or oil molecules and this latticework structure controls the release of the penicillin or other drug molecule from the gel. It is for this reason that I prefer to use as gelling agents a metal salt of the same or a similar fatty acid as that of the oil or ester. Aluminum 2-ethylhexoate, for example, is a good gelling agent for ethyl-alpha-phenyl-butyrate and I have prepared satisfactory compositions from such gels in accordance with my invention.

The amount of aluminum monostearate or other gelling agent which is used in accordance with my invention is generally within the range of approximately 0.1 to approximately 10 percent, and preferably within the range of 1 to 3 percent of the oil or ester. These percentages, as well as all other percentages with reference to this particular phase of my invention, represents parts by weight of the gelling agent to parts by volume of the oil or ester; these percentages are abbreviated in some instances herein to the conventional symbol "percent (w/v)" or "% (w/v)." A gel formed by gelling peanut oil with 2 percent (w/v) of aluminum stearate is a preferred material for the preparation of compositions of this invention. The effect of varying the proportions of these gelling agents on the characteristics of the repository compositions is shown in clinical results listed hereinafter. It is desirable to use as little of the metal salt or soap as possible for the gelling of the ester since such materials may slow down the subsequent absorption of the composition in the body after all the therapeutic agent has been absorbed.

To gel the oil or ester, the oil is heated with the gelling agent, preferably with stirring, to a suitable temperature, which may vary somewhat with different esters and proportions or materials but which will generally be below 150 degrees centigrade. Peanut oil, for example, can be readily gelled by heating it with 2 percent (w/v) of aluminum monostearate to approximately 118 to 135 degrees centigrade, at which point the suspension or dispersion becomes clear. To prevent fusion or agglomeration of the aluminum stearate particles, the aluminum stearate is added below a temperature of approximately 80 degrees centigrade and preferably at the start at room temperature, and the entire batch is kept well stirred during the heating, which may be at the rate of approximately 2 to 3 degrees per minute. There is no great danger in overheating, provided decomposition of the oil is not engendered; the characteristics of the gel are not substantially affected by heating for longer periods or to higher temperatures. Other methods are known for effecting the gelation but none appears to be as effective and as easily performed and controlled as this simple heating step.

After the ester has been gelled, it is cooled, the penicillin or penicillin salt or other therapeutically active derivative thereof is added thereto in powdered form and incorporated therewith by stirring. For the preparation of penicillin repository compositions, any of the penicillins, including G, F, K and X, their sodium, potassium, calcium, aluminum, procaine, and other salts and therapeutically active derivatives may be used. Crystalline penicillins are preferred, but amorphous particles may be used, and crystalline penicillins having a particle size smaller than approximately 50 microns are preferred as described hereinafter. The proportion of penicillin that is added is controlled by the use to which the composition is to be put, but is generally such that a single normal injectable quantity thereof (10 milliliters or less, for example) contains sufficient penicillin to provide a blood level of more than 0.03 unit per milliliter for a period of 48 hours or more after injection. Generally 300,000 units in one milliliter of the repository composition is a satisfactory concentration and this will provide the specific minimum therapeutic blood level for more than 48 hours when 1 milliliter of such a composition is injected parenterally.

Although the repository composition as thus prepared, which consists essentially of particles of a therapeutically active penicillin dispersed in an oil that has been gelled with an aluminum stearate, and which is substantially free of water, will achieve the objects specified, the composition may contain other ingredients, namely, other drugs; substances such as cobalt salts or vitamin Ks to augment the effectiveness of the penicillin; wetting agents and viscosity increasing agents to vary the flow properties of the gel; and hygroscopic salts such as anhydrous magnesium sulfate, sodium citrate, sodium chloride and the like, to absorb any water which might be introduced, for example by contact of the composition with wet syringes.

Clinical results and examples of the products of my invention and methods for their preparation are described hereinafter.

*Example 1.*—Procaine penicillin G in peanut oil with 2% (w/v) aluminum monostearate To 1 liter of peanut oil at a temperature of approximately 20 degrees centigrade is added 20 grams of powdered commercial aluminum monostearate and the mixture is heated slowly with stirring at the rate of about 2 to 3 degrees centigrade per minute until the mixture clears. The temperature at this point will be approximately 120 degrees centigrade. The heating is continued slowly until the temperature reaches 135 degrees centigrade to insure that the aluminum stearate has been completely incorporated and will not separate out upon cooling.

After the material has cooled to room temperature, procaine penicillin G crystals having a small particle size (95% of the particles being less than 5 microns in size) were added in an amount equivalent to three hundred million units to the gel and dispersed therein with stirring.

Compositions were prepared in accordance with Example 1 except that, in place of procaine penicillin G, an equal amount (three hundred million units) of the following penicillin particles were dispersed in 1 liter of the gelled peanut oil:

*Example 2.*—Crystalline sodium penicillin G, particle size 50% or more over 50 microns.

Example 3.—Aluminum penicillin, particle size 50% or more over 50 microns.

Example 4.—Crystalline procaine penicillin, particle size 50% or more over 50 microns.

Comparison Example 1

For purposes of comparison, a suspension of procaine penicillin G in ungelled peanut oil was prepared. This contained the same crystalline procaine penicillin G as was used in Example 4 (50% or more over 50 microns).

Comparison Example 2

For purposes of comparison, a suspension of crystalline sodium penicillin G particles having a particle size of 50% or more over 50 microns was made in peanut oil containing 4.8 percent (w/v) white beeswax in accordance with the conventional Romansky formula.

Each of the foregoing six preparations (Examples 1 to 4 and Comparative Examples 1 and 2) were administered to a different group of patients in single doses of 300,000 units, injected intramuscularly. Blood levels were determined (by both the Rammelkamp and a cup plate method using *Sarcina lutea*) after various periods following such injection and were as follows. (The data for these preparations have previously been published in the article by E. W. Thomas, R. H. Lyons, M. J. Romansky, C. R. Rein, and D. K. Kitchen, Newer Repository Penicillin Products, in J. Amer. Med. Assoc., vol. 135, page 1517, August 21, 1948):

NUMBER OF PATIENTS, AVERAGE BLOOD LEVELS AND PERCENT OF PATIENTS WITH BLOOD CONCENTRATIONS OF .03 UNIT PER MILLILITER OR HIGHER AT SUCCESSIVE TIME INTERVALS FOLLOWING SINGLE INJECTIONS (300,000 UNITS EACH)

*Example 1.—Procaine penicillin G in peanut oil with 2% (w/v) aluminum monostearate (small particle)*

| Time in Hours Following Administration | Number of Patients | Average Blood Levels | Percent of Patients with Blood Level .03 or Higher |
|---|---|---|---|
| 1 | 184 | 0.169 | 98.3 |
| 12 | 179 | 0.104 | 76.7 |
| 24 | 208 | 0.114 | 93.3 |
| 30 | 178 | 0.088 | 90.0 |
| 36 | 182 | 0.076 | 84.7 |
| 40 | 128 | 0.071 | 84.7 |
| 48 | 206 | 0.091 | 88.1 |
| 72 | 190 | 0.077 | 79.5 |
| 96 | 173 | 0.057 | 75.0 |

*Example 2.—Sodium penicillin G in peanut oil with 2% (w/v) aluminum monostearate*

| Time in Hours Following Administration | Number of Patients | Average Blood Levels | Percent of Patients with Blood Level .03 or Higher |
|---|---|---|---|
| 1 | 18 | 2.583 | 100.0 |
| 12 | 16 | 0.140 | 87.5 |
| 24 | 16 | 0.038 | 62.5 |
| 30 | 17 | 0.022 | 23.5 |
| 36 | 18 | 0.013 | 27.8 |
| 40 | 18 | 0.010 | 16.7 |
| 48 | 18 | 0.004 | 11.1 |

*Example 3.—Aluminum penicillin in peanut oil with 2% (w/v) aluminum monostearate*

| Time in Hours Following Administration | Number of Patients | Average Blood Levels | Percent of Patients with Blood Level .03 or Higher |
|---|---|---|---|
| 1 | 39 | 0.251 | 100.0 |
| 12 | 45 | 0.083 | 88.9 |
| 24 | 47 | 0.067 | 55.3 |
| 30 | 39 | 0.035 | 33.3 |
| 36 | 43 | 0.013 | 16.3 |
| 40 | 39 | 0.002 | 2.6 |
| 48 | 46 | 0.006 | 8.7 |

*Example 4.—Procaine penicillin G in peanut oil with 2% (w/v) aluminum monostearate (large particle)*

| Time in Hours Following Administration | Number of Patients | Average Blood Levels | Percent of Patients with Blood Level .03 or Higher |
|---|---|---|---|
| 1 | 160 | 0.593 | 98.7 |
| 12 | 162 | 0.244 | 98.1 |
| 24 | 162 | 0.120 | 90.1 |
| 30 | 161 | 0.092 | 82.6 |
| 36 | 159 | 0.069 | 75.5 |
| 40 | 160 | 0.050 | 63.8 |
| 48 | 161 | 0.038 | 52.2 |

*Comparison Example 1.—Procaine penicillin G in peanut oil*

| Time in Hours Following Administration | Number of Patients | Average Blood Levels | Percent of Patients with Blood Level .03 or Higher |
|---|---|---|---|
| 1 | 81 | 1.120 | 100.0 |
| 12 | 80 | 0.190 | 78.8 |
| 24 | 78 | 0.050 | 42.3 |
| 30 | 75 | 0.019 | 18.7 |
| 36 | 75 | 0.010 | 12.0 |
| 40 | 75 | 0.006 | 12.0 |
| 48 | 75 | 0.003 | 4.0 |

*Comparison Example 2.—Sodium penicillin G in peanut oil with 4.8% (w/v) white beeswax*

| Time in Hours Following Administration | Number of Patients | Average Blood Levels | Percent of Patients with Blood Level .03 or Higher |
|---|---|---|---|
| 1 | 17 | 1.032 | 100.0 |
| 12 | 20 | 1.310 | 100.0 |
| 24 | 22 | 0.077 | 77.3 |
| 30 | 17 | 0.035 | 58.8 |
| 36 | 17 | 0.021 | 41.1 |
| 40 | 13 | 0.004 | 10.0 |
| 48 | 19 | 0.002 | 5.3 |

From the foregoing clinical results, the following is apparent:

1. Sodium penicillin in gelled peanut oil gives longer repository action than the same substance in peanut oil and beeswax (Example 2 and Comparison Example 2).

2. Procaine penicillin G (large particles) in gelled peanut oil gives longer repository action than the same substance in ungelled peanut oil (Example 4 and Comparison Example 1).

3. Procaine penicillin G (small particles) in gelled peanut oil gives much longer repository action than large particles of the same substance in gelled peanut oil (Ex. 1 and Ex. 4).

These results are also represented graphically on Figure 1 accompanying this specification. The initial concentration and the rate of falling off of the blood level should be particularly noted.

Although the repository compositions of my invention may contain particles of large sizes, as previously stated, such as are more than 50 microns in size and yet small enough to pass through the orifices of hypodermic syringes, I have discovered that when the particles are predominantly small sized, namely from approximately 0.2 to approximately 50 microns, the repository effect of the compositions is unexpectedly improved and the minimum therapeutic blood level is maintained for a much longer period. This is exemplified in the following results, which were obtained by the use of rabbits as test animals.

Figure 2:
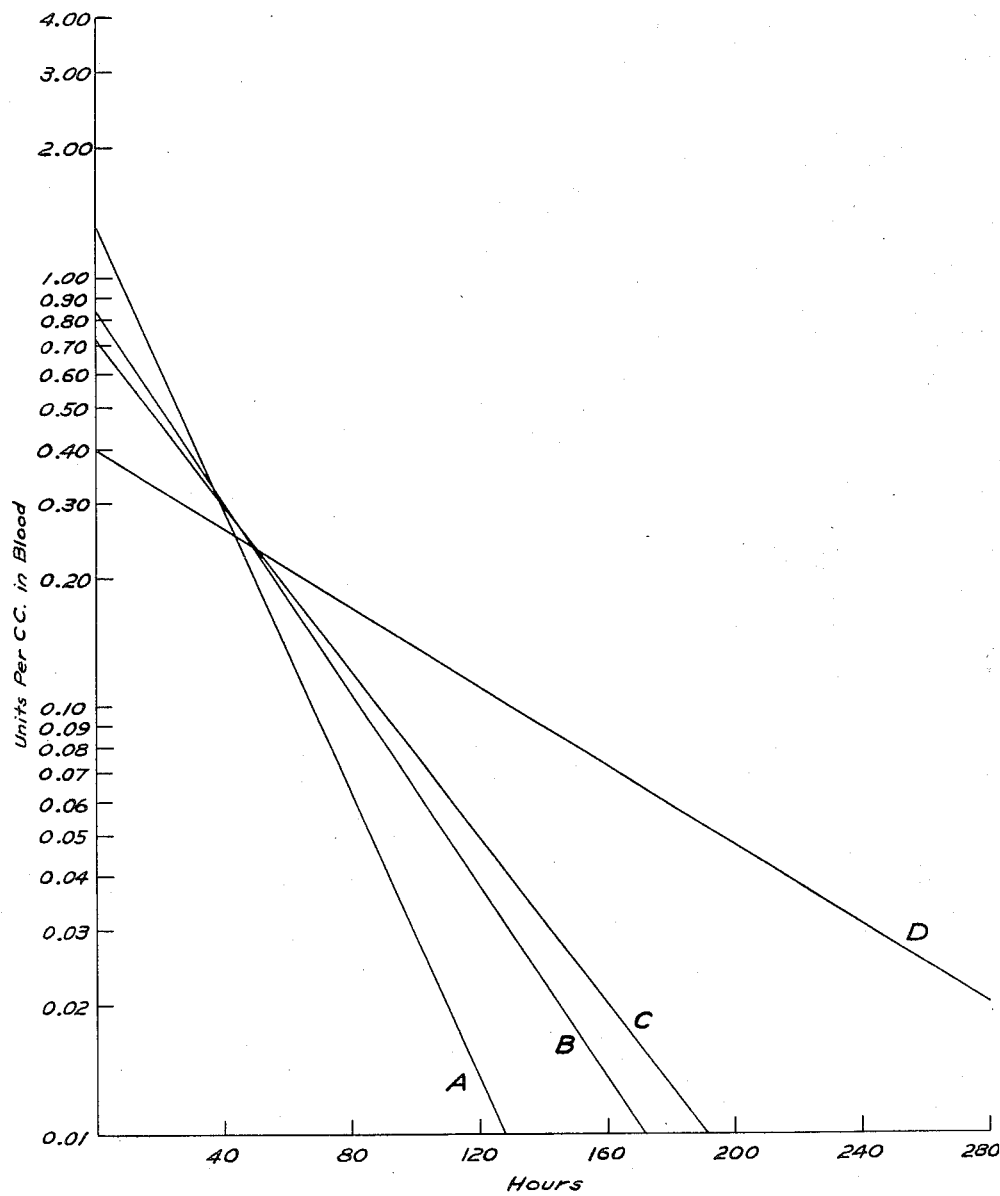

The preparations used were suspensions in peanut oil that was gelled with 2 percent (w/v) of aluminum monostearate, in accordance with Example 1, in which were suspended crystals of procaine penicillin G that were graded in size by means of sieves. The amount added was sufficient to give a preparation assaying 300,000 units per milliliter. These suspensions were then injected into test rabbits in an amount corresponding to 50,000 units of penicillin per kilogram of animal body weight and samples of blood were then withdrawn from the animals after the specified periods and assayed for penicillin. The results were as follows (NR signifying "No ring" or O and TR signifying "Trace"): These results are shown graphically on Figure 2 of the accompanying drawings and are designated A, B, C, etc., to correspond with the following tables:

BLOOD LEVELS IN UNITS PER MILLILITER AFTER VARIOUS INTERVALS PROCAINE PENICILLIN G OF VARIOUS PARTICLE SIZES (50,000 UNITS PER KILOGRAM BODY WEIGHT) IN PEANUT OIL GELLED WITH 2% (w/v) ALUMINUM MONOSTEARATE (TEST ANIMAL: RABBIT)

*150 microns to 250 microns (A)*

| Rabbit No. | 4 hrs. | 24 hrs. | 29 hrs. | 52 hrs. | 76 hrs. | 100 hrs. |
|---|---|---|---|---|---|---|
| 365 | 0.85 | 0.43 | 0.17 | 0.15 | 0.09 | 0.06 |
| 366 | 1.05 | 0.25 | 0.20 | 0.18 | 0.08 | 0.07 |
| 368 | 9.5 | 0.39 | 0.18 | 0.079 | 0.07 | 0.05 |
| 370 | 0.78 | 0.54 | 0.22 | 0.075 | 0.03 | NR |
| 371 | 3.05 | 0.45 | 0.21 | 0.098 | 0.05 | |
| Avg | 3.05 | 0.412 | 0.196 | 0.1164 | 0.064 | 0.045 |

*60 microns (B)*

| Rabbit No. | 4 hrs. | 23 hrs. | 28 hrs. | 48 hrs. | 72 hrs. |
|---|---|---|---|---|---|
| 347 | 1.30 | 0.76 | 0.18 | 0.36 | 0.13 |
| 348 | 0.55 | 0.19 | 0.30 | 0.28 | 0.36 |
| 349 | 0.32 | 0.33 | 0.28 | 0.35 | 0.33 |
| Avg | 0.72 | 0.43 | 0.25 | 0.33 | 0.27 |

*60 microns*

| Rabbit No. | 72 hrs. | 96 hrs. | 120 hrs. | 144 hrs. |
|---|---|---|---|---|
| 328 | 0.15 | 0.08 | 0.05 | NR |
| 283 | 0.19 | 0.07 | 0.03 | NR |
| 286 | 0.23 | 0.07 | TR | NR |
| 287 | 0.21 | 0.06 | TR | 0.11 |
| 288 | 0.14 | 0.06 | NR | NR |
| Avg | 0.184 | 0.07 | 0.03 | 0.02 |

*35 microns (C)*

| Rabbit No. | 4 hrs. | 24 hrs. | 48 hrs. | 72 hrs. | 96 hrs. | 120 hrs. | 168 hrs. |
|---|---|---|---|---|---|---|---|
| 344 | 0.24 | 0.40 | 0.25 | 0.22 | 0.15 | 0.09 | NR |
| 346 | 0.31 | 0.53 | 0.34 | 0.32 | 0.23 | 0.07 | NR |
| 347 | 0.38 | 0.26 | 0.52 | 0.46 | 0.34 | 0.09 | NR |
| 348 | 0.21 | 0.52 | 0.31 | 0.53 | 0.29 | 0.04 | NR |
| 349 | 0.41 | 0.30 | 0.39 | 0.48 | 0.10 | NR | NR |
| Avg | 0.31 | 0.40 | 0.36 | 0.40 | 0.22 | 0.06 | NR |

*1 to 2 microns (D)*

| Rabbit No. | 1 hr. | 4 hrs. | 24 hrs. | 28 hrs. | 48 hrs. | 77 hrs. | 96 hrs. | 150 hrs. | 174 hrs. | 198 hrs. |
|---|---|---|---|---|---|---|---|---|---|---|
| 382 | 0.30 | 0.17 | 0.18 | 0.20 | 0.27 | 0.20 | 0.23 | 0.04 | 0.04 | NR |
| 383 | 0.60 | 0.22 | 0.31 | 0.27 | 0.42 | 0.16 | 0.24 | 0.10 | 0.09 | >0.03 |
| 384 | 0.35 | 0.14 | 0.19 | 0.14 | 0.20 | 0.06 | 0.12 | 0.06 | 0.05 | >0.03 |
| 385 | 0.63 | 0.28 | 0.25 | 0.27 | 0.26 | 0.24 | 0.37 | 0.09 | 0.06 | NR |
| 386 | 0.66 | 0.25 | 0.35 | 0.34 | 0.32 | 0.17 | 0.15 | 0.07 | 0.06 | >0.05 |
| 387 | 0.27 | 0.09 | 0.19 | 0.18 | 0.17 | 0.20 | 0.20 | 0.11 | 0.02 | NR |
| 388 | 0.74 | 0.18 | 0.29 | 0.21 | 0.23 | 0.13 | 0.24 | 0.06 | 0.06 | NR |
| 389 | 0.41 | 0.15 | 0.19 | 0.25 | 0.20 | 0.23 | 0.29 | 0.10 | 0.05 | NR |
| 390 | 0.96 | 0.28 | 0.23 | 0.30 | 0.26 | 0.20 | 0.25 | 0.06 | NR | NR |
| 391 | 0.49 | 0.26 | 0.30 | 0.21 | 0.33 | 0.25 | 0.19 | NR | | NR |
| Avg | 0.53 | 0.20 | 0.248 | 0.237 | 0.266 | 0.184 | 0.228 | 0.069 | 0.047 | |

In order to show the effect of varying the proportion of aluminum stearate used in gelling the oil and also the effect of differences in particle size, peanut oil was gelled by heating with respectively 0.1, 1.0, 2.0, 3.0, 5.0 and 10.0 per cent (w./v.) of aluminum monostearate. Peanut oil that was gelled with more than 3% aluminum monostearate produced a viscous waxy solid composition. To one portion of each of these gels was added procaine penicillin G crystals having an average maximum particle size of approximately 150 microns (100-mesh) and to another was added the same penicillin in micronized form, that is, crystals having an average maximum particle size of 2 microns. The amounts added in each case were sufficient to give a preparation assaying 300,000 units per milliliter. These suspensions were then injected into test rabbits in an amount corresponding to 50,000 units of penicillin per kilogram animal body weight and samples of blood were withdrawn from the animals after the specified periods and assayed for penicillin. The results are reported as hereinbefore:

BLOOD LEVELS IN UNITS PER MILLILITER AFTER VARIOUS INTERVALS PROCAINE PENICILLIN G OF 150-MICRONS PARTICLE SIZE (50,000 UNITS PER KILOGRAM BODY WEIGHT) IN PEANUT OIL GELLED WITH VARIOUS QUANTITIES OF ALUMINUM MONOSTEARATE (TEST ANIMAL: RABBIT)

*Peanut oil*

| Rabbit No. | Blood Levels, hrs. | | | | | |
|---|---|---|---|---|---|---|
| | 1 | 4 | 24 | 48 | 72 | 96 |
| 265 | 2.7 | 1.30 | 0.30 | NR | NR | NR |
| 270 | 4.3 | 1.95 | NR | NR | NR | NR |
| 272 | 2.2 | 2.30 | 0.03 | NR | NR | NR |
| 273 | 3.7 | 2.30 | NR | NR | NR | NR |
| 277 | 1.95 | 1.60 | NR | NR | NR | NR |
| Avg | 2.97 | 1.89 | 0.066 | 0 | 0 | 0 |

0.1% aluminum monostearate gel

| Rabbit No. | Blood Levels, hrs. | | | | | |
|---|---|---|---|---|---|---|
| | 1 | 4 | 24 | 48 | 72 | 96 |
| 279 | 5.1 | 2.10 | NR | NR | NR | NR |
| 284 | 2.95 | 3.75 | NR | NR | NR | NR |
| 290 | 3.5 | 1.60 | 0.41 | NR | NR | NR |
| 300 | 2.2 | 1.80 | 0.41 | >0.28 | NR | NR |
| 303 | 1.3 | 1.10 | 0.39 | >0.02 | NR | NR |
| Avg | 3.0 | 2.07 | 0.24 | 0.06 | 0 | 0 |

1.0% aluminum monostearate gel

| Rabbit No. | Blood Levels, hrs. | | | | | | |
|---|---|---|---|---|---|---|---|
| | 1 | 4 | 24 | 48 | 72 | 96 | 120 |
| 310 | 5.5 | 2.20 | NR | NR | NR | NR | |
| 318 | 3.5 | 1.40 | 0.63 | 0.15 | NR | NR | |
| 335 | 1.0 | 0.40 | 0.48 | 0.40 | 0.10 | NR | NR |
| 381 | 4.2 | 2.20 | NR | NR | NR | NR | |
| 420 | 1.05 | 0.80 | Died | | | | |
| Avg | 3.0 | 1.4 | 0.28 | 0.14 | 0.02 | 0 | |

2.0% aluminum monostearate gel

| Rabbit No. | Blood Levels, hrs. | | | | | | | |
|---|---|---|---|---|---|---|---|---|
| | 1 | 4 | 24 | 48 | 72 | 96 | 120 | 144 |
| 448 | 5.00 | 5.40 | Died | | | | | |
| 475 | 2.65 | | | | | | | |
| 459 | 3.35 | 0.90 | 0.18 | 0.11 | 0.07 | NR | 0.05 | >0.02 |
| 462 | 3.3 | 1.20 | 0.48 | 0.35 | 0.02 | NR | NR | |
| 464 | 0.575 | 0.21 | 0.27 | 0.71 | NR | NR | | |
| Avg | 2.98 | 1.92 | 0.31 | 0.39 | 0.03 | 0 | 0.03 | |

3.0% aluminum monostearate gel

| Rabbit No. | Blood Levels, hrs. | | | | | | | | | | | | |
|---|---|---|---|---|---|---|---|---|---|---|---|---|---|
| | 1 | 4 | 24 | 48 | 72 | 96 | 120 | 144 | 168 | 192 | 216 | 240 | 264 |
| 214 | 1.20 | 0.65 | 0.40 | 0.19 | lost | 0.04 | 0.02 | NR | 0 | 0 | | | |
| 216 | 3.35 | 1.05 | 0.55 | 0.26 | 0.13 | 0.06 | 0.02 | NR | 0 | 0 | | | |
| 220 | 1.30 | 0.65 | 0.50 | 0.31 | 0.24 | 0.11 | 0.06 | 0.03 | 0.024 | 0.03 | 0.05 | >0.02 | NR |
| 452 | 1.45 | Died | | | | | | | | | | | |
| 450 | 2.55 | 1.70 | 0.93 | 0.28 | 0.10 | 0.06 | 0.05 | >0.02 | NR | 0 | | | |
| Avg | 1.97 | 1.01 | 0.60 | 0.26 | 0.16 | 0.07 | 0.04 | 0.01 | 0.01 | 0.01 | 0.01 | 0.01 | |

5.0% aluminum monostearate gel

| Rabbit No. | Blood Level, hrs. | | | | | | | | | | | | | |
|---|---|---|---|---|---|---|---|---|---|---|---|---|---|---|
| | 1 | 4 | 24 | 48 | 72 | 96 | 120 | 144 | 168 | 192 | 216 | 240 | 264 | 312 |
| 229 | 2.50 | 1.10 | 0.29 | 0.19 | 0.47 | 0.06 | 0.04 | >0.02 | NR | 0 | | | | |
| 230 | 1.00 | 0.58 | 0.29 | 0.30 | 0.10 | 0.11 | 0.02 | NR | 0 | 0 | | | | |
| 237 | 1.30 | 0.33 | 0.19 | 0.15 | 0.16 | 0.17 | 0.09 | 0.03 | 0.04 | 0.04 | 0.03 | >0.02 | 0.04 | NR |
| 245 | 1.25 | 0.95 | 0.21 | 0.17 | 0.09 | 0.07 | 0.04 | >0.02 | 0.02 | Died | | | | |
| 262 | 1.05 | 0.50 | 0.39 | 0.47 | 0.26 | 0.22 | 0.14 | 0.05 | 0.03 | 0.04 | 0.04 | >0.02 | 0.03 | NR |
| Avg | 1.42 | 0.69 | 0.27 | 0.26 | 0.22 | 0.13 | 0.07 | 0.02 | 0.02 | 0.02 | 0.02 | 0.01 | 0.02 | 0 |

10.0% aluminum monostearate gel

| Rabbit No. | Blood Level, hrs. | | | | | | | | | | | | |
|---|---|---|---|---|---|---|---|---|---|---|---|---|---|
| | 1 | 4 | 24 | 48 | 72 | 96 | 120 | 144 | 168 | 192 | 216 | 240 | 264 |
| 448 | 0.65 | 0.42 | Died | | | | | | | | | | |
| 269 | 0.75 | 0.18 | 0.28 | 0.54 | 0.32 | 0.30 | 0.09 | 0.12 | 0.03 | NR | | | |
| 276 | 0.44 | 0.53 | 0.12 | 0.26 | 0.15 | 0.10 | 0.07 | 0.05 | 0.04 | Died | | | |
| 307 | 0.65 | 0.18 | 0.23 | 0.96 | 0.23 | 0.15 | 0.06 | 0.03 | 0.03 | 0.04 | 0.10 | >0.02 | NR |
| 308 | 0.50 | 0.24 | Died | | | | | | | | | | |
| Avg | 0.60 | 0.31 | 0.21 | 0.59 | 0.23 | 0.18 | 0.07 | 0.07 | 0.03 | 0.01 | | | |

BLOOD LEVELS IN UNITS PER MILLILITER AFTER VARIOUS INTERVALS MICRONIZED (1 TO 2 MICRONS PARTICLES) PROCAINE PENICILLIN G (50,000 UNITS PER KILOGRAM BODY WEIGHT) GELLED WITH VARIOUS QUANTITIES OF ALUMINUM MONOSTEARATE (TEST ANIMAL: RABBIT)

Peanut oil

| Rabbit No. | Blood Level, hrs. | | | | | |
|---|---|---|---|---|---|---|
| | 1 | 4 | 24 | 48 | 72 | 96 |
| 259 | 3.9 | 2.50 | NR | Died | | |
| 317 | 1.05 | 0.39 | Died | | | |
| 360 | 5.25 | 3.70 | 0.04 | NR | NR | NR |
| 362 | 3.75 | 2.45 | NR | NR | NR | NR |
| 363 | 4.5 | 3.50 | NR | NR | NR | |
| Avg | 3.7 | 2.5 | 0.01 | 0 | 0 | 0 |

0.1% aluminum monostearate gel

| Rabbit No. | Blood Level, hrs. | | | | | |
|---|---|---|---|---|---|---|
| | 1 | 4 | 24 | 48 | 72 | 96 |
| 366 | 3.3 | 2.45 | NR | NR | NR | NR |
| 367 | 4.85 | 2.20 | 0.31 | Died | | |
| 370 | 3.6 | 0.85 | 0.40 | >0.02 | NR | NR |
| 371 | 5.0 | 1.95 | 0.32 | 0.04 | NR | NR |
| 372 | 1.45 | 1.25 | 0.21 | Died | | |
| Avg | 3.6 | 1.7 | 0.25 | 0.01 | 0 | 0 |

1.0% aluminum monostearate gel

| Rabbit No. | Blood Level, hrs. | | | | | | |
|---|---|---|---|---|---|---|---|
| | 1 | 4 | 24 | 48 | 72 | 96 | 120 |
| 373 | 3.0 | 1.30 | 0.45 | 0.06 | NR | NR | |
| 374 | 0.975 | 0.44 | 0.38 | 0.14 | NR | NR | |
| 379 | 2.65 | 1.15 | 0.43 | 0.25 | 0.03 | NR | NR |
| 386 | NR | 2.70 | Died | | | | |
| 387 | NR | 1.10 | NR | NR | NR | NR | |
| 400 | 1.75 | 0.90 | Died | | | | |
| Avg | 1.4 | 1.3 | 0.32 | 0.11 | 0.01 | 0 | |

2.0% aluminum monostearate gel

| Rabbit No. | Blood Level, hrs. | | | | | | | |
|---|---|---|---|---|---|---|---|---|
| | 1 | 4 | 24 | 48 | 72 | 96 | 120 | 144 |
| 461 | 0.725 | 0.34 | 0.29 | 0.29 | 0.10 | NR | 0.05 | NR |
| 471 | 0.90 | 0.39 | 0.24 | 0.28 | 0.70 | 0.05 | NR | |
| 473 | 1.1 | 1.15 | 0.22 | 0.18 | 0.10 | 0.06 | 0.09 | NR |
| 474 | 3.1 | Died | | | | | | |
| Avg | 1.45 | 0.63 | 0.25 | 0.25 | 0.30 | 0.04 | 0.05 | 0 |

3.0% aluminum monostearate gel

| Rabbit No. | Blood Level, hrs. | | | | | | | | | | | | |
|---|---|---|---|---|---|---|---|---|---|---|---|---|---|
| | 1 | 4 | 24 | 48 | 72 | 96 | 120 | 144 | 168 | 192 | 216 | 240 | 264 | 312 |
| 313 | 0.50 | 0.29 | 0.25 | 0.41 | 0.31 | 0.28 | 0.28 | 0.10 | 0.02 | NR | | | | |
| 317 | 0.90 | 0.45 | 0.68 | 0.41 | 0.31 | 0.14 | 0.05 | Died | | | | | | |
| 323 | 0.90 | 0.29 | 0.34 | 0.04 | 0.19 | 0.55 | 0.04 | NR | | | | | | |
| 326 | 1.65 | 0.42 | 0.34 | 0.25 | 0.23 | 0.07 | 0.06 | 0.10 | 0.06 | 0.05 | 0.04 | >0.02 | 0.03 | NR |
| 331 | 1.00 | 0.53 | 0.45 | 0.21 | 0.26 | 0.14 | 0.10 | 0.04 | NR | | | | | |
| Avg | 0.99 | 0.40 | 0.41 | 0.26 | 0.26 | 0.24 | 0.11 | 0.06 | 0.02 | 0.01 | 0.01 | 0.02 | 0.01 | 0 |

5.0% aluminum monostearate gel

| Rabbit No. | Blood Level, hrs. | | | | | | | | | | | | |
|---|---|---|---|---|---|---|---|---|---|---|---|---|---|
| | 1 | 4 | 24 | 48 | 72 | 96 | 120 | 144 | 168 | 192 | 216 | 240 | 164 |
| 336 | 0.80 | 0.75 | 0.31 | 0.41 | 0.34 | 0.23 | 0.07 | 0.03 | NR | | | | |
| 344 | 0.65 | 0.34 | 0.36 | 0.43 | 0.30 | 0.14 | Died | | | | | | |
| 348 | 0.60 | 0.46 | 0.35 | 0.37 | 0.19 | 0.14 | 0.05 | 0.03 | NR | | | | |
| 350 | 0.98 | 0.31 | 0.48 | 0.40 | 0.19 | Died | | | | | | | |
| 351 | 0.65 | 0.33 | 0.39 | 0.39 | 0.26 | 0.45 | 0.20 | 0.10 | 0.05 | 0.04 | 0.02 | >0.02 | NR |
| Avg | 0.74 | 0.44 | 0.38 | 0.40 | 0.26 | 0.24 | 0.11 | 0.05 | 0.01 | 0.01 | 0 | 0 | 0 |

10.0 aluminum monostearate gel

| Rabbit No. | Blood Level, hrs. | | | | | | | | | | | | |
|---|---|---|---|---|---|---|---|---|---|---|---|---|---|
| | 1 | 4 | 24 | 48 | 72 | 96 | 120 | 144 | 168 | 192 | 216 | 240 | 264 | 312 |
| 353 | 1.45 | 0.43 | 0.37 | 0.22 | 0.08 | 0.23 | 0.06 | 0.04 | NR | | | | | |
| 358 | 0.40 | 0.19 | 0.21 | 0.20 | 0.13 | 0.09 | 0.07 | 0.04 | 0.06 | 0.03 | 0.04 | >0.02 | 0.03 | NR |
| 367 | 0.09 | 0.06 | 0.10 | 0.04 | 0.06 | 0.07 | 0.04 | 0.06 | Died | | | | | |
| 368 | 0.65 | 0.24 | 0.22 | 0.09 | 0.13 | 0.11 | 0.06 | 0.04 | 0.04 | >0.02 | 0.03 | >0.02 | | NR |
| 376 | 0.39 | 0.13 | 0.14 | 0.13 | 0.11 | 0.10 | 0.09 | Died | | | | | | |
| Avg | 0.60 | 0.21 | 0.21 | 0.13 | 0.10 | 0.12 | 0.06 | 0.05 | 0.03 | 0.01 | 0.02 | 0.01 | 0.01 | 0 |

From these results it is apparent that the repository effect is prolonged by an increase in the proportion of aluminum monostearate used for gelling the oil, but the practical application of this is restricted by the character of the resulting product and the possible delay in the absorption of the gel itself thereafter in the body. It will also be noted that the preparations containing the micronized particles are consistently as good or better than those containing the larger (150-mesh) particles in their delaying action.

In order to show the effect of differences in penicillin concentration of the composition of this invention, preparations were made with peanut oil that had been gelled with 2% (w/v) aluminum stearate in accordance with Example 1, in which was suspended respectively, 10,000, 50,000, 100,000, and 200,000 units of procaine penicillin G per milliliter of the preparation (results on a 300,000 unit per milliliter preparation appear hereinbefore). These tests were also made on rabbits as hereinbefore, the amount injected corresponding to 50,000 units per kilogram body weight of each preparation. Two sets of preparations were used, one in which the particles had a maximum average size of 150 microns (100-mesh), the other containing micronized (1 to 2 mesh) crystals of procaine penicillin G. The tests were performed as hereinbefore described and the results were as follows:

BLOOD LEVELS IN UNITS PER MILLILITER AFTER VARIOUS INTERVALS PROCAINE PENICILLIN G OF 150-MICRONS PARTICLE SIZE (50,000 UNITS PER KILOGRAM BODY WEIGHT) IN VARIOUS CONCENTRATIONS IN PEANUT OIL GELLED WITH 2% (W/V) ALUMINUM MONOSTEARATE (TEST ANIMAL: RABBIT)

*10,000 units per milliliter*

| Rabbit No. | Blood Levels, Hrs. | | | | |
|---|---|---|---|---|---|
| | 1 | 4 | 24 | 48 | 72 |
| 690 | 0.37 | 0.10 | NR | NR | NR |
| 604 | 0.21 | 0.03 | NR | NR | NR |
| 696 | 0.06 | 0.04 | NR | NR | NR |
| 703 | 0.27 | 0.09 | NR | NR | NR |
| 741 | 0.22 | 0.04 | NR | NR | NR |
| Avg | 0.23 | 0.06 | 0 | 0 | 0 |

*50,000 units per milliliter*

| Rabbit No. | Blood Levels, Hrs. | | | | |
|---|---|---|---|---|---|
| | 1 | 4 | 24 | 48 | 72 |
| 853 | 1.20 | 0.19 | 0.06 | NR | NR |
| 859 | 1.45 | 0.17 | 0.05 | NR | NR |
| 907 | 1.70 | 0.15 | NR | NR | NR |
| 932 | 2.50 | 0.39 | Died | | |
| 946 | 1.40 | 0.19 | Died | | |
| Avg | 1.65 | 0.218 | 0.04 | 0 | 0 |

*100,000 units per milliliter*

| Rabbit No. | Blood Levels, Hrs. | | | | |
|---|---|---|---|---|---|
| | 1 | 4 | 24 | 48 | 72 |
| 250 | 2.90 | 1.25 | NR | NR | NR |
| 253 | 1.75 | 1.30 | NR | NR | NR |
| 254 | 3.20 | 0.65 | 0.05 | NR | NR |
| 256 | 1.70 | 0.39 | 0.14 | >0.02 | NR |
| 258 | 1.30 | 0.26 | 0.26 | NR | NR |
| Avg | 2.17 | 0.770 | 0.09 | 0 | 0 |

*200,000 units per milliliter*

| Rabbit No. | Blood Levels, Hrs. | | | | | |
|---|---|---|---|---|---|---|
| | 1 | 4 | 24 | 48 | 72 | 96 |
| 325 | 2.00 | 1.25 | 0.12 | NR | NR | |
| 329 | 2.35 | Died | | | | |
| 354 | 2.00 | 0.85 | Died | | | |
| 357 | 1.40 | 0.21 | 0.13 | 0.12 | 0.08 | NR |
| 372 | 2.15 | 0.21 | 0.27 | 0.25 | Died | |
| Avg | 2.18 | 0.63 | 0.173 | 0.123 | 0.04 | 0 |

BLOOD LEVELS IN UNITS PER MILLILITER AFTER VARIOUS INTERVALS MICRONIZED (1 TO 2 MICRON PARTICLES) PROCAINE PENICILLIN G IN VARIOUS CONCENTRATIONS IN PEANUT OIL GELLED WITH 2% (W/V) ALUMINUM MONOSTEARATE (TEST ANIMAL: RABBIT)

*10,000 units per milliliter*

| Rabbit No. | Blood Levels, hrs. | | | | |
|---|---|---|---|---|---|
| | 1 | 4 | 24 | 48 | 72 |
| 796 | 0.30 | 0.07 | NR | NR | NR |
| 800 | 0.28 | 0.06 | NR | NR | NR |
| 813 | 0.17 | 0.05 | NR | NR | NR |
| 819 | 0.19 | 0.05 | NR | NR | NR |
| 847 | 0.04 | 0.03 | NR | NR | NR |
| Avg | 0.196 | 0.056 | 0 | 0 | 0 |

*50,000 units per milliliter*

| Rabbit No. | Blood Levels, hrs. | | | | |
|---|---|---|---|---|---|
| | 1 | 4 | 24 | 48 | 72 |
| 963 | 0.60 | 0.15 | 0.12 | 0.03 | NR |
| 221 | 1.00 | 0.15 | 0.09 | NR | NR |
| 224 | 0.60 | 0.19 | 0.03 | NR | NR |
| 236 | 0.27 | 0.18 | 0.10 | >0.02 | NR |
| 241 | 0.32 | 0.14 | 0.07 | NR | NR |
| Avg | 0.558 | 0.16 | 0.08 | 0.001 | |

*100,000 units per milliliter*

| Rabbit No. | Blood Levels, hrs. | | | | | |
|---|---|---|---|---|---|---|
| | 1 | 4 | 24 | 48 | 72 | 96 |
| 261 | 0.55 | 0.06 | 0.20 | 0.14 | Died | |
| 268 | 0.80 | 0.50 | 0.26 | 0.05 | 0.08 | NR |
| 316 | 0.40 | 0.12 | 0.05 | 0.09 | Died | |
| 328 | 2.25 | 0.55 | 0.06 | NR | NR | |
| 334 | 0.50 | 0.17 | 0.23 | 0.05 | Died | |
| Avg | 0.90 | 0.28 | 0.16 | 0.066 | 0.02 | 0 |

*200,000 units per milliliter*

| Rabbit No. | Blood Levels, Hrs. | | | | | | |
|---|---|---|---|---|---|---|---|
| | 1 | 4 | 24 | 48 | 72 | 96 | 120 |
| 378 | 0.44 | 0.11 | 0.105 | 0.10 | 0.11 | >0.02 | NR |
| 438 | 1.05 | 0.35 | 0.24 | 0.10 | 0.02 | NR | |
| 472 | 0.42 | 0.19 | 0.12 | 0.11 | Died | | |
| 494 | 1.05 | 0.25 | Died | | | | |
| 492 | 1.50 | 0.28 | Died | | | | |
| Avg | 0.89 | 0.24 | 0.15 | 0.103 | 0.04 | 0 | |

From the above results it will be apparent that it is preferable to employ more than 100,000 units per milliliter to obtain optimum results.

Inasmuch as the foregoing specification comprises preferred embodiments of the invention, it is to be understood that variations and modifications may be made therein in accordance with the principles disclosed, without departing from the scope of the invention, which is to be limited solely by the appended claims.

I claim:

1. A substantially anhydrous injectable therapeutic preparation comprising a therapeutically effective salt of penicillin dispersed in a vehicle comprising an injectable oil having dispersed therein a quantity of a fatty acid salt of a metal selected from the group consisting of aluminum, zirconium and germanium sufficient to maintain prolonged effective blood levels of penicillin upon injection of said preparation compared with the blood levels obtained upon injection of a similar preparation containing no fatty acid salt of said metal, said fatty acid being selected from a group consisting of long chain saturated and unsaturated monocarboxylic acids having from 12 to 22 carbon atoms inclusive.

2. A substantially anhydrous injectable therapeutic preparation comprising a therapeutically effective salt of penicillin dispersed in a vehicle comprising an injectable oil having dispersed therein a quantity of an aluminum salt of a fatty acid selected from a group consisting of long chain saturated and unsaturated monocarboxylic acids having from 12 to 22 carbon atoms, inclusive, in the molecule, sufficient to maintain prolonged effective blood levels of penicillin upon injection of said preparation compared with the blood levels obtained upon injection of a similar preparation containing no aluminum salt of a fatty acid.

3. A substantially anhydrous therapeutic preparation comprising a therapeutically effective salt of penicillin dispersed in a vehicle comprising an injectable oil having dispersed therein a quantity of an aluminum stearate sufficient to maintain prolonged effective blood levels of penicillin upon injection of said preparation compared with the blood levels obtained upon injection of a similar preparation containing no stearate.

4. A substantially anhydrous therapeutic preparation as set forth in claim 3 characterized in that said injectable oil is a non-drying saponifiable oil which is normally liquid and the quantity of an aluminum stearate dispersed in said injectable oil is within the range of from approximately 0.1 to approximately 10 per cent based upon parts by weight of said stearate to parts by volume of said oil.

5. A substantially anhydrous therapeutic preparation as set forth in claim 3 characterized in that said injectable oil is a non-drying saponifiable oil which is normally liquid and the quantity of an aluminum stearate dispersed in said injectable oil is within the range of from 1 to 3 per cent based upon parts by weight of said stearate to parts by volume of said oil.

6. A substantially anhydrous therapeutic preparation comprising a therapeutically effective salt of penicillin dispersed in a vehicle comprising peanut oil having dispersed therein 5 per cent of aluminum monostearate based upon parts by weight of said stearate to parts by volume of said oil, said aluminum monostearate being effective to maintain prolonged therapeutically effective blood levels of penicillin upon injection of said preparation compared with the blood levels obtained upon injection of a similar preparation containing no monostearate.

7. A substantially anhydrous therapeutic preparation comprising a therapeutically effective salt of penicillin dispersed in a vehicle comprising peanut oil having dispersed therein 2 per cent of aluminum monostearate based upon parts by weight of said stearate to parts by volume of said oil, said aluminum monostearate being effective to maintain prolonged therapeutically effective blood levels of penicillin upon injection of said preparation compared with the blood levels obtained upon injection of a similar preparation containing no monostearate.

8. A substantially anhydrous injectable therapeutic preparation comprising procaine penicillin dispersed in a vehicle comprising an injectable oil having dispersed therein a quantity of an aluminum stearate sufficient to maintain prolonged effective blood levels of penicillin upon injection of said preparation compared with the blood levels obtained upon injection of a similar preparation containing no stearate.

9. A substantially anhydrous therapeutic preparation as set forth in claim 8 characterized in that said procaine penicillin is crystalline procaine penicillin having a particle size in the range of from approximately 0.2 to approximately 50 microns.

10. A substantially anhydrous preparation as set forth in claim 8 characterized in that said injectable oil is a non-drying saponifiable oil which is normally liquid and the quantity of an aluminum stearate dispersed in said injectable oil is within the range of from approximately 0.1 to approximately 10 per cent based upon parts by weight of said stearate to parts by volume of said oil.

11. A substantially anhydrous preparation as set forth in claim 8 characterized in that said injectable oil is a non-drying saponifiable oil which is normally liquid and the quantity of an aluminum stearate dispersed in said injectable oil is within the range of from 1 to 3 per cent based upon parts by weight of said stearate to parts by volume of said oil.

12. A substantially anhydrous therapeutic preparation comprising procaine penicillin dispersed in a vehicle comprising peanut oil having dispersed therein 5 per cent of aluminum monostearate based upon parts by weight of said stearate to parts by volume of said oil, said aluminum monostearate being effective to maintain prolonged therapeutically effective blood levels of penicillin upon injection of said preparation compared with blood levels obtained upon injection of a similar preparation containing no monostearate.

13. A substantially anhydrous therapeutic preparation comprising procaine penicillin dispersed in a vehicle comprising peanut oil having dispersed therein 2 per cent of aluminum monostearate based upon parts by weight of said stearate to parts by volume of said oil, said aluminum monostearate being effective to main prolonged therapeutically effective blood levels of penicillin upon injection of said preparation compared with blood levels obtained upon injection of a similar preparation containing no monostearate.

14. A substantially anhydrous therapeutic preparation as set forth in claim 13 characterized in that said procaine penicillin is crystalline procaine penicillin having a particle size within the range of from approximately 0.2 to approximately 50 microns.

15. A process for the preparation of a substantially anhydrous injectable preparation which consists of; adding a fatty acid salt of a metal selected from the group consisting of aluminum, zirconium and germanium to an injectable oil while said oil is maintained at a temperature between 20° and 80° C., said fatty acid being selected from the group consisting of long chain saturated and unsaturated monocarboxylic acids having from 12 to 22 carbon atoms inclusive in the molecule, said fatty acid salt being added in a quantity within the range of from approximately 0.1 to approximately 10 per cent based upon parts by weight of said fatty acid salt to parts by volume of said oil; slowly heating the mixture of fatty acid salt and oil to a temperature of approximately 135° C. with constant stirring to gel said oil; cooling the gelled oil to room temperature; and thereafter adding particles of a therapeutically effective salt of penicillin with stirring to disperse said salt of penicillin in said anhydrous gelled oil.

16. A process for the preparation of a substantially anhydrous injectable preparation which consists of; adding a fatty acid salt of a metal selected from the group consisting of aluminum, zirconium and germanium to an injectable oil while said oil is maintained at a temperature between 20° and 80° C., said fatty acid being selected from the group consisting of long chain saturated and unsaturated monocarboxylic acids having from 12 to 22 carbon atoms inclusive in the molecule, said fatty acid salt being added in a quantity within the range of from approximately 0.1 to approximately 10 per cent based upon parts by weight of said fatty acid salt to parts by volume of said oil; slowly heating the mixture of fatty acid salt and oil to a temperature of approximately 135° C. with constant stirring to gel said oil; cooling the gelled oil to room temperature; and thereafter adding particles of procaine penicillin with stirring to disperse said procaine penicillin in said anhydrous gelled oil.

17. The process as set forth in claim 16 characterized in that said procaine penicillin is crystalline procaine penicillin having a particle size within the range of from approximately 0.2 to approximately 50 microns.

FRANK HAROLD BUCKWALTER.

REFERENCES CITED

The following references are of record in the file of this patent:

UNITED STATES PATENTS

| Number | Name | Date |
|---|---|---|
| 2,055,083 | Klein | Sept. 22, 1936 |

OTHER REFERENCES

Quarterly J. Pharmacy and Pharmacology, January–March, 1947, pp. 22–27.
Ohio State Med. J., August 1942, page 756.
Science, September 1, 1944, pages 196 to 198.
The Lancet, April 13, 1946, pp. 526–529.
J. Amer. Med. Assn., November 1, 1947, pp. 567–569.